(12) United States Patent
van Nee

(10) Patent No.: US 8,654,911 B2
(45) Date of Patent: Feb. 18, 2014

(54) UPLINK SDMA PILOT ESTIMATION

(75) Inventor: Richard van Nee, De Meern (NL)

(73) Assignee: Qualcomm Incorporated, San Diego, CA (US)

( * ) Notice: Subject to any disclaimer, the term of this patent is extended or adjusted under 35 U.S.C. 154(b) by 859 days.

(21) Appl. No.: 12/349,713

(22) Filed: Jan. 7, 2009

(65) Prior Publication Data

US 2010/0046681 A1 Feb. 25, 2010

Related U.S. Application Data

(60) Provisional application No. 61/090,361, filed on Aug. 20, 2008.

(51) Int. Cl.
*H04B 1/10* (2006.01)

(52) U.S. Cl.
USPC .......................................... 375/347; 375/341

(58) Field of Classification Search
USPC ................................. 375/341, 347
See application file for complete search history.

(56) References Cited

U.S. PATENT DOCUMENTS

| | | | |
|---|---|---|---|
| 5,694,388 A * | 12/1997 | Sawahashi et al. ........... | 370/206 |
| 2002/0006122 A1 | 1/2002 | Zeira | |
| 2006/0039331 A1 * | 2/2006 | Abeta et al. .................... | 370/335 |
| 2006/0221808 A1 | 10/2006 | Shirakata et al. | |
| 2007/0070877 A1 | 3/2007 | Sun et al. | |
| 2007/0121764 A1 | 5/2007 | Chen et al. | |
| 2007/0218910 A1 * | 9/2007 | Hill et al. ....................... | 455/445 |

FOREIGN PATENT DOCUMENTS

| | | |
|---|---|---|
| CN | 1610288 A | 4/2005 |
| JP | 2006191238 A | 7/2006 |
| JP | 2006314088 A | 11/2006 |
| KR | 20050067343 A | 7/2005 |
| WO | WO2006018035 | 2/2006 |
| WO | WO2007103099 | 9/2007 |
| WO | WO2007121346 | 10/2007 |

OTHER PUBLICATIONS

International Search Report and Written Opinion—PCT/US2009/054090, International Search Authority—European Patent Office—Aug. 5, 2010.

* cited by examiner

*Primary Examiner* — Michael Neff
(74) *Attorney, Agent, or Firm* — Eric Ho

(57) ABSTRACT

Systems and/or methods for communications wherein a plurality of spatial streams are received. Each of these spatial streams comprises a symbol having at least one phase shifted pilot signal. The Minimum Mean Square Error (MMSE) estimates of the phase shifted pilot signals are computed and the MMSE estimates are used to estimate phase errors for the symbols.

32 Claims, 3 Drawing Sheets

UPLINK SDMA PILOT ESTIMATION

CROSS-REFERENCE TO RELATED APPLICATIONS

Claim of Priority under 35 U.S.C. §119

The present patent application claims priority to Provisional Application No. 61/090,361, entitled "UPLINK SDMA PILOT ESTIMATION" filed Aug. 20, 2008, and assigned to the assignee hereof and hereby expressly incorporated by reference herein.

BACKGROUND

I. Field

The following description relates generally to communication systems, and more particularly to uplink SDMA pilot estimation.

II. Background

In order to address the issue of increasing bandwidth requirements that are demanded for wireless communication systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Spatial Division Multiple Access (SDMA) is a multiple access scheme which enables multiple streams transmitted to different receivers at the same time to share the same frequency channel and, as a result, provide higher user capacity. SDMA is a common and typical MIMO scheme in cellular wireless systems. In an uplink SDMA transmission, each spatial stream may exhibit a different common phase error because of frequency errors and phase noise differences between different uplink users (access terminals). A number of methods are employed to estimate common phase errors for each user in an uplink SDMA transmission.

SUMMARY

In one aspect of the disclosure, an apparatus for communications comprises a processing system configured to receive a plurality of spatial streams. Each of the spatial streams comprises a symbol having at least one phase shifted pilot signal. The processing system is further configured to compute MMSE estimates of the phase shifted pilot signals and use the MMSE estimates to estimate phase errors for the symbols.

In another aspect of the disclosure, a method for communication comprises receiving a plurality of spatial streams, wherein each of the spatial streams comprises a symbol having at least one phase shifted pilot signal. The method further comprises computing MMSE estimates of the phase shifted pilot signals; and estimating phase errors for the symbols using the MMSE estimates.

In yet another aspect of the disclosure, an apparatus for communication comprises means for receiving a plurality of spatial streams, wherein each of the spatial streams comprises a symbol having at least one phase shifted pilot signal. The apparatus further comprises means for computing MMSE estimates of the phase shifted pilot signals; and means for estimating phase errors for the symbols using the MMSE estimates.

In a further aspect of the disclosure, a computer-program product for wireless communication, comprises a machine-readable medium. The medium is encoded with instructions executable to receive a plurality of spatial streams, wherein each of the spatial streams comprises a symbol having at least one phase shifted pilot signal; compute MMSE estimates of the phase shifted pilot signals; and estimate phase errors for the symbols using the MMSE estimates.

In yet a further aspect of the disclosure, an access point comprises a wireless network adapter configured to support a backhaul connection for a peer node to a network, and a processing system. The processing is configured to receive a plurality of spatial streams wherein each of the spatial streams comprises a symbol having at least one phase shifted pilot signal; compute MMSE estimates of the phase shifted pilot signals; and estimate phase errors for the symbols using the MMSE estimates.

BRIEF DESCRIPTION OF THE DRAWINGS

These and other sample aspects of the invention will be described in the detailed description that follow, and in the accompanying drawings, wherein.

Figure 1:
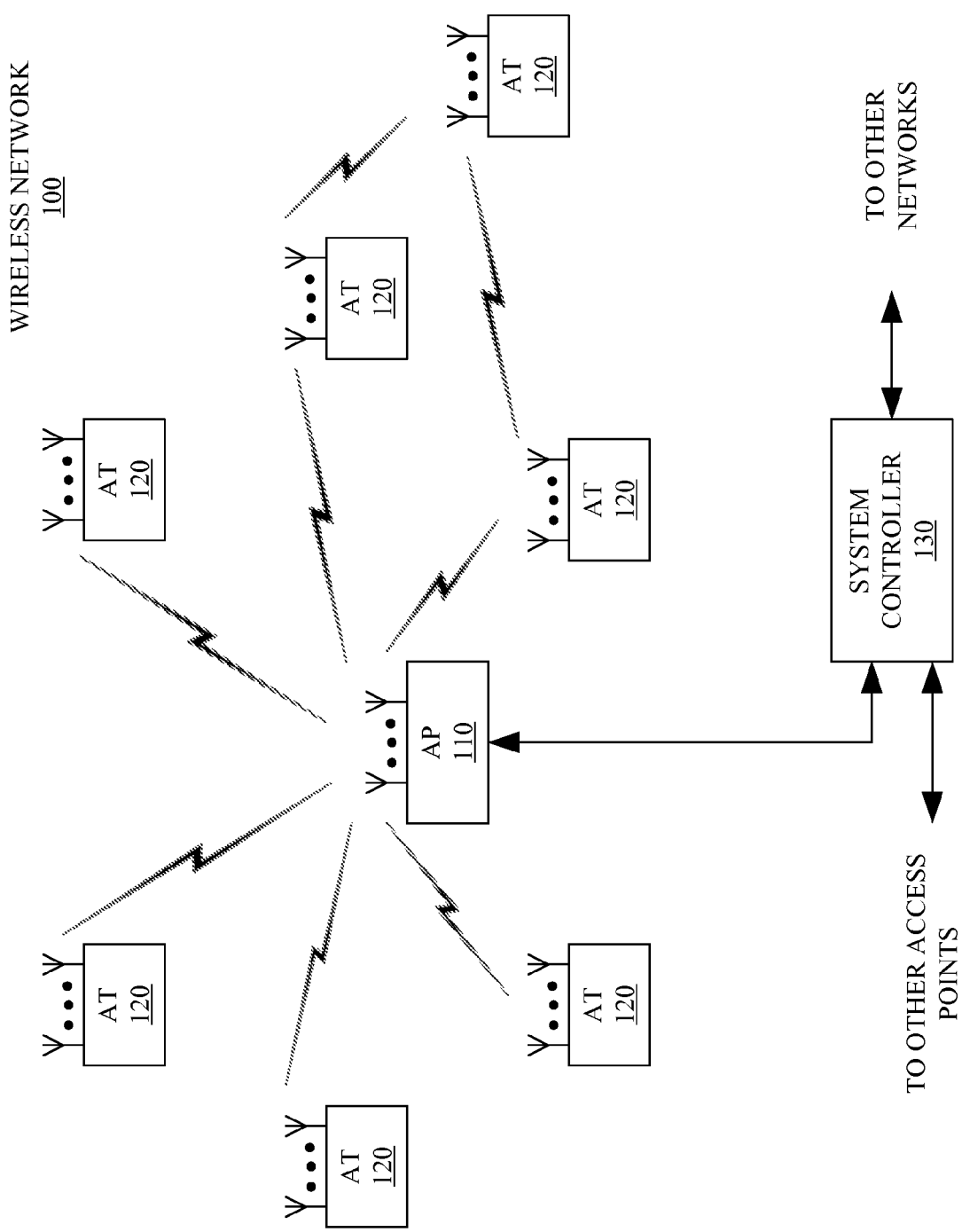
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage, however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using SDMA. As explained in the background section of this disclosure, SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard.

Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
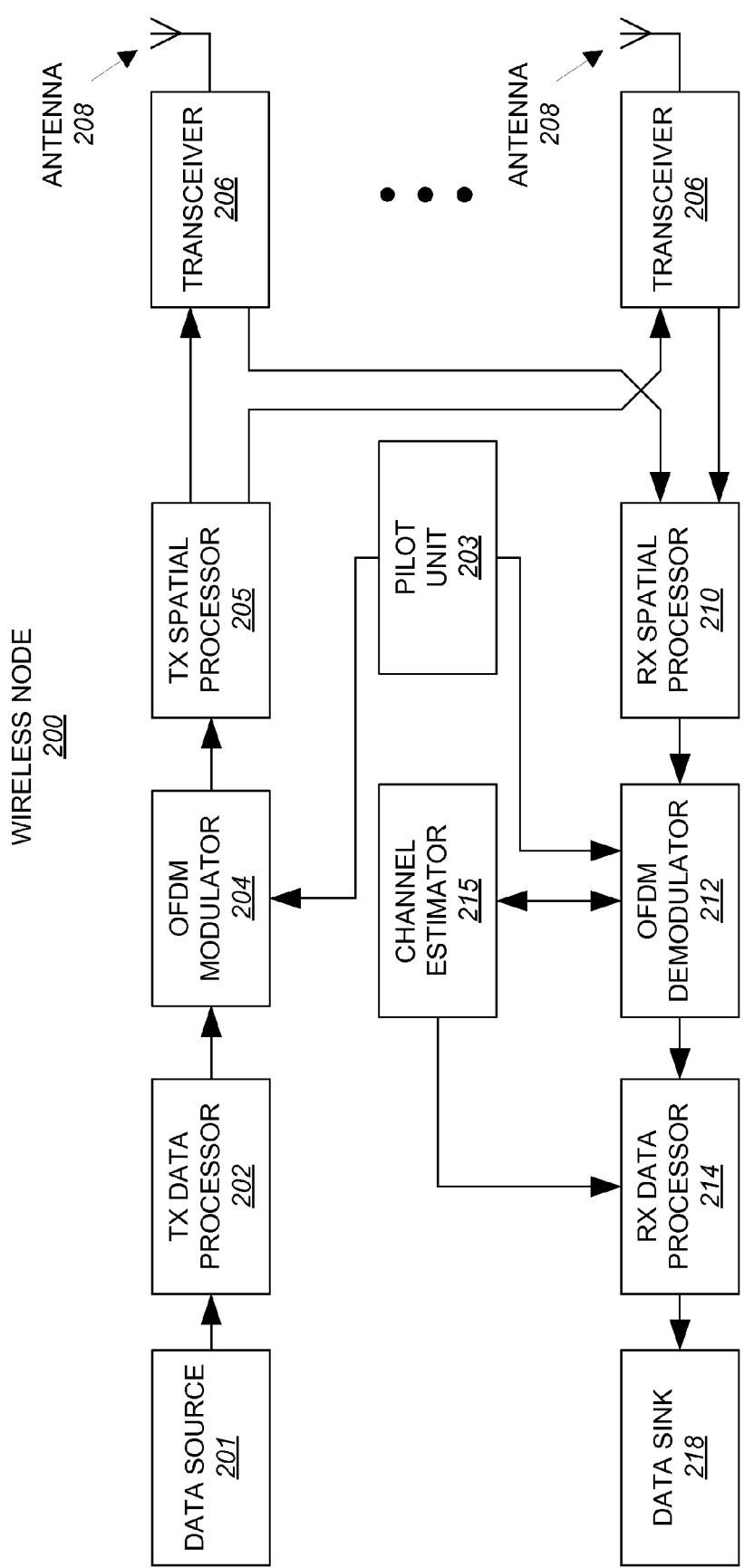
FIG. 2 is a block diagram of an example of a wireless node.

FIG. 2 is a conceptual block diagram illustrating an example of a wireless node. In a transmit mode, a TX data processor 202 may be used to receive data from a data source 201 and encode (e.g., Turbo code) the data to facilitate forward error correction (FEC) at the receiving node. The encoding process results in a sequence of code symbols that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into a number of parallel streams and then maps each stream to a subcarrier using some modulation constellation. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of a wireless node, at least one pilot signal is carried along with the payload in each data packet. A pilot is typically a non-data-bearing spread spectrum signal generated by the pilot unit 203, employed to enable a receiver to acquire the timing of one or more associated data-bearing (traffic) signal channels, and to provide a phase reference for coherent demodulation of such associated traffic channels. The OFDM modulator 204 splits the pilot signals into a number of parallel streams, and then maps each stream to a subcarrier using some modulation constellation. An IFFT is then performed on each set of subcarriers to produce one or more time domain OFDM symbols which constitutes the pilot signals. The pilot signals are then appended to payload carried by each data packet before providing the data packets to a TX spatial processor 205.

A TX spatial processor 205 performs spatial processing on the data packets. This may be accomplished by spatially precoding the data packets into a number of spatially precoded streams and then providing each spatially precoded stream to a different antenna 208 via a transceiver 206. Each transceiver 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover data packets carried any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique.

The OFDM demodulator 212 recovers the data carried on each subcarrier in the OFDM symbols in the payload of the data packet and multiplexes the data into a stream of modulation symbols including pilot signals. The OFDM demodulator 212 converts the stream from time-domain to the frequency domain using a Fast Fourier Transfer (FFT). The frequency domain signal comprises a separate stream for each subcarrrier.

The channel estimator 215 receives the streams which contain the pilot signals from the OFDM demodulator and estimates the channel response. Each pilot signal will be generally shifted in phase due to the transmission through the wireless channel. The MMSE estimates of the phase shifted pilot signals are computed and the MMSE estimates are used to estimate phase errors and consequently the channel response. The channel response is provided to the RX data processor 214.

The RX data processor 214 is used to translate the modulation symbols back to the correct point in the signal constellation. Because of noise and other disturbances in the wireless channel, the modulation symbols may not correspond to an exact location of a point in the original signal constellation. Using the channel response, the RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs and the phase error estimates in order to decode the data that was originally transmitted before providing the data to a data sink 218.

Figure 3:
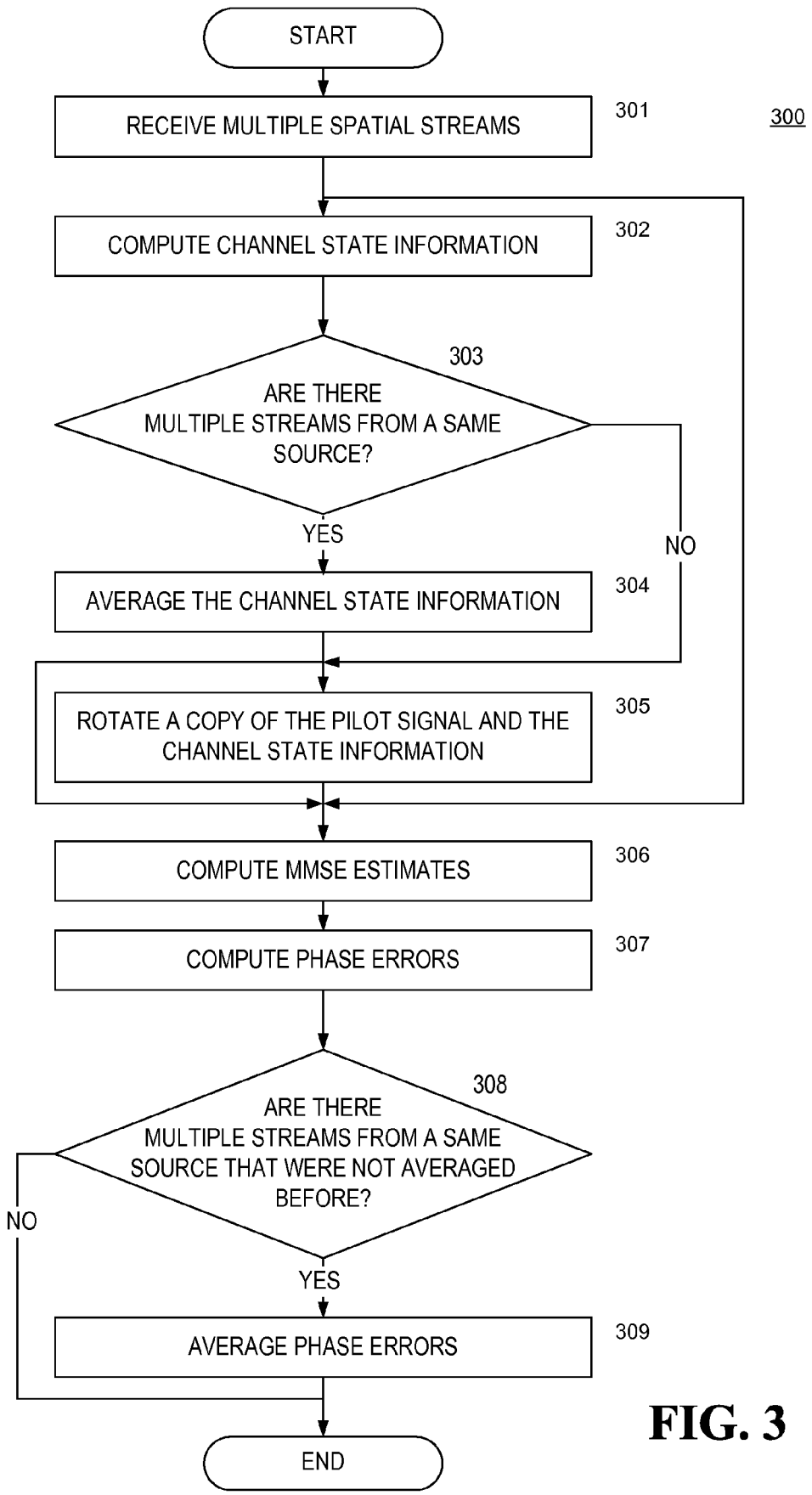
FIG. 3 is a diagram of various functional blocks of the channel estimator of FIG. 2.

FIG. 3 is a flow chart illustrating the functionality of a channel estimator. Note that the input to the channel estimator is the output of the OFDM demodulator 212 (see FIG. 2) after taking an FFT on the signal. As such, in uplink SDMA pilot estimation, after taking an FFT on a received uplink symbol, the received pilot value $r_{jmk}$ for receiver j, symbol m, pilot k, is $$r_{jmk} = \sum_{i=0}^{N_{ss}-1} H_{ij} p_{ikm} e^{j\varphi_{im}} + n_{jmk}$$

$p_{ikm}$ is the sign of pilot k at symbol m for spatial stream i. H is a mathematical value which represents a signal channel. Each uplink user may transmit one or more spatial streams. The total number of pilot subcarriers is k, which is, for example, 6 for a 40 MHz channel. $n_{jmk}$ is additive noise and $\varphi_{im}$ is the common phase error of spatial stream i during symbol m. In matrix notation, the received pilot vector $r_{mk}$ can be written as:

$$r_{mk} = H_k s_{km} + n_{mk}$$

Where $s_{km}$ is a vector containing the known pilot signs $p_{ikm}$, phase shifted by the unknown phase errors $\varphi_{im}$ per spatial stream.

It is assumed that the frequency offsets between different uplink users are much smaller than a subcarrier spacing, such that the effects of intercarrier interference can be ignored. In practice, this means that the uplink users must first synchronize their carrier and sampling frequency to the AP.

Next, the in the second block 302 channel state information is computed, if the channel state information is not know. Channel State Information (CSI) is information about the current value of H, a mathematical value which represents a signal channel. The CSI can be computed on a per symbol basis. It forms part of the signal model in Wireless communications, the full equation of which is $$R = HX + N$$

Where R is the received signal, X is transmittal signal, N is the noise, and H is the channel. The values R, X, N, H are usually not constant. The system usually needs to have some information regarding H to figure out what was sent from the transmitter or to enhance system performance, such as increasing transmission speed. The information can be the current value of H, or the covariance of H. This type of information is generally referred as CSI and is usually estimated. Usually the current value of H is referred as short-term CSI, while the higher order statistics of H are referred as long-term CSI.

In the next block 304, the channel state information is averaged, if multiple streams are from a same source node as determined by the third block 303. Regarding cyclic delays, if the data symbols use a cyclic delay that is different from the cyclic delays in the channel estimation symbols, then each row in the H matrices of the methods described above that belongs to pilot number k and spatial stream i may be phase rotated (Block 305) by $e^{(j2\pi f_k T_{cdi})}$, where $f_k$ is the frequency of pilot k and $T_{cdi}$ is the cyclic delay difference between data and channel estimation symbols for spatial stream i. In the $5^{th}$ block 305, a copy of the pilot signals and the channel state information are rotated. In the next block 306, the MMSE estimates are computed. The MMSE estimates can be computed using the following formula:

$$(\hat{s}_{km} = (s_n I_{Nss} + H_k^H H_k)^{-1} H_k^H r_{mk})$$

Where $s_n$ is an estimate of the noise power and $I_{Nss}$ is the $N_{ss} \times N_{ss}$ identity matrix.

A copy of the pilot signals may be stored, and the phase error for the symbol may be estimated from the MMSE estimate and the copy of the pilot signals. The phase error estimates per spatial stream per symbol can be derived as:

$$\hat{\varphi}_{im} = \text{angle}\left(\sum_{k=0}^{K-1} p_{ikm} \hat{s}_{ikm}\right)$$

Another method is to combine all pilot subcarriers within a symbol. When a symbol includes several subcarriers, the processing system computes the channel state information on a per subcarrier basis. In this case, the processing system computes the MMSE estimate using the following formula:

$$r_{mk} = \begin{bmatrix} H_0 P_{m0} \\ H_1 P_{m1} \\ \ldots \\ H_{K-1} P_{mK-1} \end{bmatrix} s_m + n_m = H_m s_m + n_m$$

Where $P_{mk}$ is a diagonal $N_{ss} \times N_{ss}$ matrix containing the pilot signs for pilot k on symbol m, and $s_m$ is a vector of $N_{ss}$ phase offset exponentials with element i being $e^{(j\Phi_{im})}$.

Then, a copy of the pilot signals is stored, and the phase error for the symbol are estimated as stated in the 7$^{th}$ block 307 from the MMSE estimate and the copy of the pilot signals. The phase error may be obtained using the following formula:

$$\hat{\phi}_{im} = \text{angle}((s_n I_{ss} + H_m^H H_m)^{-1} H_m^H r_{mk})$$

Since the modified channel matrix $H_m$ contains k times more rows than the channel Hk per subcarrier, it generally has a much better condition number and hence gives a more accurate phase error estimate than the method of using individual MMSE estimates per pilot subcarrier.

Regarding users with Multiple Spatial Streams, if one or more uplink users transmit on more than one spatial stream as determined by the 3$^{rd}$ block 303 or the 8$^{th}$ block 308, then several alternatives exist to improve the per spatial stream estimates. First, it is possible to average the phase error estimates that belong to the same user as stated in the 9$^{th}$ block 309.

Another approach is to average the components within the angle operation that belong to the same user. The equation can be written as follows:

$$r_{mk} = \begin{bmatrix} \sum_{i=0}^{Nss0-1} H_{i0} P_{im0} & \sum_{i=Nss0}^{Nss0+Nss1-1} H_{i0} P_{im0} & \sum_{i=Nss0+\ldots Nss(U-1)}^{Nss0+\ldots NssU-1} H_{i0} P_{im0} \\ \ldots & \ldots & \ldots \\ \ldots & \ldots & \ldots \\ \sum_{i=0}^{Nss0-1} H_{i(K-1)} P_{im(K-1)} & \sum_{i=Nss0}^{Nss0+Nss1-1} H_{i(K-1)} P_{im(K-1)} & \sum_{i=Nss0+\ldots Nss(U-1)}^{Nss0+\ldots NssU-1} H_{i(K-1)} P_{im(K-1)} \end{bmatrix} s_m + n_m$$
$$= H_m s_m + n_m$$

Where U is the number of users and $N_{ssu}$ is the number of spatial streams for user number u. $s_m$ now only has U elements instead of $N_{ss}$.

As there are less variables that need to be estimated, the modified channel matrix $H_m$ generally has a better condition number resulting in better phase error estimates. The same equation can be used to obtain phase error estimates, with the only difference that subscript i now denotes user number instead of spatial stream number. In the extreme case where there is only one user transmitting all spatial streams, $H_m$ becomes a column vector such that the equation for phase error computation reduces to one for single user processing.

Therefore, where at least two of the spatial streams received are from the same node source, the phase error estimates may be averaged (Block 309) for said at least two of the spatial streams. Or, the channel state information may be computed (Block 302), and the channel state information for said at least two of the streams may be averaged (Block 304), and the averaged channel state information may be used to compute the MMSE estimate (Block 306).

Regarding phase offset correction, once phase offset estimates per spatial stream are available, they have to be used to eliminate their effect on MIMO data detection. In a conventional MIMO receiver with one common phase offset that is equal for all spatial streams, common phase correction can be performed prior to the MIMO detector by applying an inverse phase shift to all MIMO detector input signals. This approach is not possible if there are different phase offsets for different spatial streams. In this case, the estimated phase shift per spatial stream can be used to phase shift each column of the channel matrix that is an input to the MIMO detector. If the MIMO detector performs a QR decomposition on the channel, then the phase shift per spatial stream can be applied to columns of the R-matrix. In the case of an MMSE MIMO detector, inverse phase shifts can be applied to the MMSE outputs for all spatial streams, prior to slicing the MMSE outputs.

Furthermore, it is noted that various other aspects of the channel estimate may use some or all of the above blocks. For example, in one exemplary implementation of the channel estimator, an apparatus receives a number of spatial streams (Block 301). Each of the spatial streams includes a symbol. The symbol includes at least one phase shifted pilot signal. The processing system computes MMSE estimates of the phase shifted pilot signals (Block 306) and uses the MMSE estimates to estimate phase errors for the symbols (Block 307).

It is understood that any specific order or hierarchy of steps described above is being presented to provide an example of the process involved in channel estimation. Based upon design preferences, it is understood that the specific order or hierarchy of steps may be rearranged while remaining within the scope of the invention.

The channel estimator may be implemented with one or more general purpose processors, digital signal processors (DSP)s, application specific integrated circuits (ASIC)s, field programmable gate array (FPGA)s, programmable logic devices (PLD)s, other programmable logic components, discrete gate or transistor logic, discrete hardware components, or any combination thereof designed to perform the functions described herein. A general purpose processor may be a microprocessor, a controller, a microcontroller, a state machine, or any other circuitry that can execute software. Software shall be construed broadly to mean instructions, data, or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable may be embodied in a computer-program product. The computer-program product may comprise packaging materials.

Whether the channel estimator is implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
a processing system configured to receive a plurality of spatial streams, wherein each of the spatial streams comprises a symbol having at least one phase shifted pilot signal, the processing system being further configured to compute Minimum Mean Square Error (MMSE) estimates of the phase shifted pilot signals and use the MMSE estimates to estimate phase errors for the symbols, compute channel state information and use the channel state information to compute the MMSE estimate, compute the channel state information on a per symbol basis, store a copy of the pilot signals, and estimate the phase error for the symbol from the MMSE estimate computed and the copy of the pilot signals, and wherein the processing system is further configured to phase rotate the copy of the pilot signals and the channel state information for one of the spatial streams when estimating the phase error to compensate for a cyclic delay in said one of the spatial streams.

2. The apparatus of claim 1 wherein the processing system is further configured to compute the MMSE estimate using the following formula:

$$\hat{s}_{km} = (s_n I_{Nss} + H_k^H H_k)^{-1} H_k^H r_{mk}$$

wherein $\hat{s}_{km}$ is the MMSE estimate for pilot k at symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_k$ is a mathematical value that represents a signal channel for pilot k and $r_{mk}$ is a received pilot vector for pilot k at symbol m.

3. The apparatus of claim 1 wherein the processing system is further configured to estimate the phase error using the following formula:

$$\hat{\varphi}_{im} = \text{angle}\left(\sum_{k=0}^{K-1} p_{ikm}\hat{s}_{ikm}\right)$$

wherein $\hat{\phi}_{im}$ is the phase error estimate for stream i during symbol m, $p_{ikm}$ is a sign of pilot k at symbol m for spatial stream i and $\hat{s}_{ikm}$ is the MMSE estimate of pilot k at symbol m for spatial stream i.

4. The apparatus of claim 1 wherein the symbol comprises a plurality of subcarriers, the processing system being further configured to compute the channel state information on a per subcarrier basis.

5. The apparatus of claim 4 wherein the processing system is further configured to compute the MMSE estimate using the following formula:

$$r_{mk} = \begin{bmatrix} H_0 P_{m0} \\ H_1 P_{m1} \\ \ldots \\ H_{K-1} P_{mK-1} \end{bmatrix} s_m + n_m = H_m s_m + n_m$$

wherein $r_{mk}$ is a received pilot vector for pilot k at symbol m, $H_k$ is a mathematical value that represents a signal channel for pilot k, $P_{mk}$ is a diagonal $N_{ss} \times N_{ss}$ matrix comprising pilot signs for pilot k on symbol m, $s_m$ is a vector of $N_{ss}$ phase offset exponentials with element i being $e^{(j\phi im)}$, $n_m$ is additive noise on symbol m, $H_m$ is a modified channel matrix that contains k times more rows than the channel $H_k$ per subcarrier, $N_{ss}$ is a total number of the spatial streams, and φim is the phase error estimate for stream i during symbol m.

6. The apparatus of claim 1 wherein the processing system is further configured to receive at least two of the spatial streams from a same source, the processing system being further configured to average the phase error estimates for said at least two of the spatial streams.

7. The apparatus of claim 1 wherein the processing system is further configured to receive at least two of the spatial streams from a same source, the processing system being further configured to compute channel state information, average the channel state information for said at least two of the streams, and use the averaged channel state information to compute the MMSE estimate.

8. The apparatus of claim 7 wherein the processing system is further configured to compute the MMSE estimate using the following formula:

$$r_{mk} = \begin{bmatrix} \sum_{i=0}^{Nss0-1} H_{i0}P_{im0} & \sum_{i=Nss0}^{Nss0+Nss1-1} H_{i0}P_{im0} & \sum_{i=Nss0+\ldots Nss(U-1)}^{Nss0+\ldots NssU-1} H_{i0}P_{im0} \\ \ldots & \ldots & \ldots \\ \ldots & \ldots & \ldots \\ \sum_{i=0}^{Nss0-1} H_{i(K-1)}P_{im(K-1)} & \sum_{i=Nss0}^{Nss0+Nss1-1} H_{i(K-1)}P_{im(K-1)} & \sum_{i=Nss0+\ldots Nss(U-1)}^{Nss0+\ldots NssU-1} H_{i(K-1)}P_{im(K-1)} \end{bmatrix} s_m + n_m$$

$$= H_m s_m + n_m$$

wherein $r_{mk}$ is a received pilot vector for pilot k at symbol m, Nssu is a number of spatial streams for user u, U is the number of users, $N_{ss}$ is a total number of the spatial streams, and $\phi im$ is the phase error estimate for stream i during symbol m, $H_{ik}$ is a mathematical value that represents a signal channel for pilot k for user i, $P_{imk}$ is a diagonal $N_{ss} \times N_{ss}$ matrix comprising pilot signs for pilot k on symbol m for user i, $s_m$ is a vector of $N_{ss}$ phase offset exponentials with element i being $e^{(j\phi im)}$, $n_m$ is additive noise on symbol m and $H_m$ is a modified channel matrix that contains k times more rows than the channel $H_k$ per subcarrier.

9. The apparatus of claim 1 wherein the processing system is further configured to use the phase error estimate to detect data carried in the symbol.

10. An apparatus for communications, comprising:
a processing system configured to receive a plurality of spatial streams, wherein each of the spatial streams comprises a symbol having at least one phase shifted pilot signal, the processing system being further configured to
compute Minimum Mean Square Error (MMSE) estimates of the phase shifted pilot signals and use the MMSE estimates to estimate phase errors for the symbols,
compute channel state information and use the channel state information to compute the MMSE estimate,
wherein the symbol comprises a plurality of subcarriers, the processing system being further configured to
compute the channel state information on a per subcarrier basis,
store a copy of the pilot signals, and
estimate the phase error for the symbol from the MMSE estimate and the copy of the pilot signals, and
wherein the processing system is further configured to estimate the phase error using the following formula:

$$\hat{\phi}_{im} = \text{angle}((s_n I_{Nss} + H_m^H H_m)^{-1} H_m^H r_{mk})$$

wherein $\hat{\phi}_{im}$ is the phase error estimate for stream i during symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_m$ is a modified channel matrix that contains k times more rows than the channel $H_k$ per subcarrier and $r_{mk}$ is a received pilot vector for pilot k at symbol m.

11. A method for communications, comprising:
receiving a plurality of spatial streams, wherein each of the spatial streams comprises a symbol having at least one phase shifted pilot signal;
computing Minimum Mean Square Error (MMSE) estimates of the phase shifted pilot signals;
estimating phase errors for the symbols using the MMSE estimates,
computing channel state information, wherein the MMSE estimates are computed using the channel state information and the channel state information is computed on a per symbol basis, and
storing a copy of the pilot signals, wherein the phase errors are estimated from the computed MMSE estimates and the copy of the pilot signals, and
wherein estimating the phase errors comprises phase rotating the copy of the pilot signals and the channel state information for one of the spatial streams to compensate for a cyclic delay in said one of the spatial streams.

12. The method of claim 11 wherein the MMSE estimates are computed using the following formula:

$$\hat{s}_{km} = (s_n I_{Nss} + H_k^H H_k)^{-1} H_k^H r_{mk}$$

wherein $\hat{s}_{km}$ is the MMSE estimate for pilot k at symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_k$ is a mathematical value that represents a signal channel for pilot k and $r_{mk}$ is a received pilot vector for pilot k at symbol m.

13. The method of claim 11 wherein the phase errors are estimated using the following formula:

$$\hat{\phi}_{im} = \text{angle}\left(\sum_{k=0}^{K-1} p_{ikm} \hat{s}_{ikm}\right)$$

wherein $\hat{\phi}_{im}$ is the phase error estimate for stream i during symbol m, $p_{ikm}$ is a sign of pilot k at symbol m for spatial stream i and $\hat{s}_{ikm}$ is the MMSE estimate of pilot k at symbol m for spatial stream i.

14. The method of claim 11 wherein the symbol comprises a plurality of subcarriers, and wherein the channel state information is computed on a per subcarrier basis.

15. The method of claim 14 wherein the MMSE estimates are computed using the following formula:

$$r_{mk} = \begin{bmatrix} H_0 P_{m0} \\ H_1 P_{m1} \\ \ldots \\ H_{K-1} P_{mK-1} \end{bmatrix} s_m + n_m = H_m s_m + n_m$$

wherein $r_{mk}$ is a received pilot vector for pilot k at symbol m, $H_k$ is a mathematical value that represents a signal channel for pilot k, $P_{mk}$ is a diagonal $N_{ss} \times N_{ss}$ matrix comprising pilot signs for pilot k on symbol m, $s_m$ is a vector of $N_{ss}$ phase offset exponentials with element i being $e^{(j\phi im)}$, $n_m$ is additive noise on symbol m, $H_m$ is a modified channel matrix that contains k times more rows than the channel $H_k$ per subcarrier, $N_{ss}$ is a total number of the spatial streams, and φm is the phase error estimate for stream i during symbol m.

16. The method of claim 11 wherein the plurality of spatial streams received comprises at least two spatial streams from a same source, and the method further comprising averaging the phase error estimates for said at least two spatial streams.

17. The method of claim 11 wherein the plurality of spatial streams received comprises at least two spatial streams from a same source, and the method further comprising averaging the channel state information for said at least two spatial streams wherein the MMSE estimates are computed using the averaged channel state information.

18. The method of claim 17 where the MMSE estimates are computed using the following formula:

$$r_{mk} = \begin{bmatrix} \sum_{i=0}^{Nss0-1} H_{i0} P_{im0} & \sum_{i=Nss0}^{Nss0+Nss1-1} H_{i0} P_{im0} & \sum_{i=Nss0+\ldots Nss(U-1)}^{Nss0+\ldots NssU-1} H_{i0} P_{im0} \\ \ldots & \ldots & \\ \ldots & \ldots & \\ \sum_{i=0}^{Nss0-1} H_{i(K-1)} P_{im(K-1)} & \sum_{i=Nss0}^{Nss0+Nss1-1} H_{i(K-1)} P_{im(K-1)} & \sum_{i=Nss0+\ldots Nss(U-1)}^{Nss0+\ldots NssU-1} H_{i(K-1)} P_{im(K-1)} \end{bmatrix} s_m + n_m$$

$$= H_m s_m + n_m$$

wherein $r_{mk}$ is a received pilot vector for pilot k at symbol m, Nssu is a number of spatial streams for user u, U is the number of users, $N_{ss}$ is a total number of the spatial streams, and φim is the phase error estimate for stream i during symbol m, $H_{ik}$ is a mathematical value that represents a signal channel for pilot k for user i, $P_{imk}$ is a diagonal $N_{ss} \times N_{ss}$ matrix comprising pilot signs for pilot k on symbol m for user i, $s_m$ is a vector of $N_{ss}$ phase offset exponentials with element i being $e^{(j\phi im)}$, $n_m$ is additive noise on symbol m and $H_m$ is a modified channel matrix that contains k times more rows than the channel $H_k$ per subcarrier.

19. The method of claim 11 wherein the estimated phase errors are used to detect data carried in the symbol.

20. A method for communications comprising,
receiving a plurality of spatial streams, wherein each of the spatial streams comprises a symbol having at least one phase shifted pilot signal;
computing Minimum Mean Square Error (MMSE) estimates of the phase shifted pilot signals;
estimating phase errors for the symbols using the MMSE estimates,
computing channel state information, wherein the MMSE estimates are computed using the channel state information, wherein the symbol comprises a plurality of subcarriers, and wherein the channel state information is computed on a per subcarrier basis, and
storing a copy of the pilot signals wherein the phase errors are estimated for the symbol from the MMSE estimates computed and the copy of the pilot signals, and
wherein the phase errors are estimated using the following formula:

$$\hat{\phi}_{im} = \text{angle}((s_n I_{Nss} + H_m^H H_m)^{-1} H_m^H r_{mk})$$

wherein $\hat{\phi}_{im}$ is the phase error estimate for stream i during symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_m$ is a modified channel matrix that contains k times more rows than the channel $H_k$ per subcarrier and $r_{mk}$ is a received pilot vector for pilot k at symbol m.

21. An apparatus for communications, comprising:
means for receiving a plurality of spatial streams, wherein each of the spatial streams comprises a symbol having at least one phase shifted pilot signal;
means for computing Minimum Mean Square Error (MMSE) estimates of the phase shifted pilot signals;
means for estimating phase errors for the symbols using the MMSE estimates, wherein the means for estimating phase errors is configured to estimate phase errors from the computed MMSE estimates and the stored copy of the pilot signals, and
means for computing channel state information, wherein the means for computing of the MMSE estimates is configured to compute the MMSE estimates using the channel state information and to compute the MMSE estimates using the channel state information, and
wherein the means for estimating the phase errors further comprises means for phase rotating the copy of the pilot signals and the channel state information for one of the spatial streams to compensate for a cyclic delay in said one of the spatial streams.

22. The apparatus of claim 21 wherein the means for computing MMSE estimates is configured to compute the estimates using the following formula:

$$\hat{s}_{km} = (s_n I_{Nss} + H_k^H H_k)^{-1} H_k^H r_{mk}$$

wherein $\hat{s}_{km}$ is the MMSE estimate for pilot k at symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_k$ is a mathematical value that represents a signal channel for pilot k and $r_{mk}$ is a received pilot vector for pilot k at symbol m.

23. The apparatus of claim 21 wherein the means for estimating the phase errors is configured to estimate the phase errors using the following formula:

$$\hat{\phi}_{im} = \text{angle}\left(\sum_{k=0}^{K-1} p_{ikm} \hat{s}_{ikm}\right)$$

wherein $\hat{\phi}_{im}$ is the phase error estimate for stream i during symbol m, $p_{ikm}$ is a sign of pilot k at symbol m for spatial stream i and $\hat{s}_{ikm}$ is the MMSE estimate of pilot k at symbol m for spatial stream i.

24. The apparatus of claim 21 wherein the symbol comprises a plurality of subcarriers, and wherein the means for computing channel state information is configured to compute channel state information on a per subcarrier basis.

25. The apparatus of claim 24 wherein the means for computing MMSE estimates is configured to compute using the following formula:

$$r_{mk} = \begin{bmatrix} H_0 P_{m0} \\ H_1 P_{m1} \\ \ldots \\ H_{K-1} P_{mK-1} \end{bmatrix} s_m + n_m = H_m s_m + n_m$$

wherein $r_{mk}$ is a received pilot vector for pilot k at symbol m, $H_k$ is a mathematical value that represents a signal channel for pilot k, $P_{mk}$ is a diagonal $N_{ss} \times N_{ss}$ matrix comprising pilot signs for pilot k on symbol m, $s_m$ is a vector of $N_{ss}$ phase offset exponentials with element i being $e^{(j\phi im)}$, $n_m$ is additive noise on symbol m, $H_m$ is a modified channel matrix that contains k times more rows than the channel $H_k$ per subcarrier, $N_{ss}$ is a total number of the spatial streams, and $\phi im$ is the phase error estimate for stream i during symbol m.

26. The apparatus of claim 21 wherein the plurality of spatial streams received comprises at least two spatial streams from a same source, and the apparatus further comprises means for averaging the phase error estimates for said at least two of the spatial streams.

27. The apparatus of claim 21 wherein the plurality of spatial streams received comprises at least two spatial streams from a same source, and the apparatus further comprises means for averaging the channel state information for said at least two of the streams wherein the means for computing MMSE estimates are configured to compute using the averaged channel state information.

28. The apparatus of claim 27 where the means for computing the MMSE estimates is configured to compute the estimates using the following formula:

$$r_{mk} = \begin{bmatrix} \sum_{i=0}^{Nss0-1} H_{i0} P_{im0} & \sum_{i=Nss0}^{Nss0+Nss1-1} H_{i0} P_{im0} & \sum_{i=Nss0+\ldots Nss(U-1)}^{Nss0+\ldots NssU-1} H_{i0} P_{im0} \\ \ldots & \ldots & \\ \ldots & \ldots & \\ \sum_{i=0}^{Nss0-1} H_{i(K-1)} P_{im(K-1)} & \sum_{i=Nss0}^{Nss0+Nss1-1} H_{i(K-1)} P_{im(K-1)} & \sum_{i=Nss0+\ldots Nss(U-1)}^{Nss0+\ldots NssU-1} H_{i(K-1)} P_{im(K-1)} \end{bmatrix} s_m + n_m$$

$$= H_m s_m + n_m$$

wherein $r_{mk}$ is a received pilot vector for pilot k at symbol m, Nssu is a number of spatial streams for user u, U is the number of users, $N_{ss}$ is a total number of the spatial streams, and $\phi im$ is the phase error estimate for stream i during symbol m, $H_{ik}$ is a mathematical value that represents a signal channel for pilot k for user i, $P_{imk}$ is a diagonal $N_{ss} \times N_{ss}$ matrix comprising pilot signs for pilot k on symbol m for user i, $s_m$ is a vector of $N_{ss}$ phase offset exponentials with element i being $e^{(j\phi im)}$, $n_m$ is additive noise on symbol m and $H_m$ is a modified channel matrix that contains k times more rows than the channel $H_k$ per subcarrier.

29. The apparatus of claim 21 wherein the means for estimating phase errors is used to detect data carried in the symbol.

30. An apparatus for communications comprising:
means for receiving a plurality of spatial streams, wherein each of the spatial streams comprises a symbol having at least one phase shifted pilot signal;
means for computing Minimum Mean Square Error (MMSE) estimates of the phase shifted pilot signals;
means for estimating phase errors for the symbols using the MMSE estimates;
means for computing channel state information, wherein the means for computing of the MMSE estimates is configured to compute the MMSE estimates using the channel state information; and
means for storing a copy of the pilot signals wherein the means for estimating phase errors is configured to estimate phase errors using the computed MMSE estimates and the stored copy of the pilot signals,
wherein the symbol comprises a plurality of subcarriers, and wherein the means for computing channel state information is configured to compute channel state information on a per subcarrier basis, and
wherein the means for estimating phase errors is configured to estimate phase errors using the following formula:

$$\hat{\phi}_{im} = \text{angle}((s_n I_{Nss} + H_m^H H_m)^{-1} H_m^H r_{mk})$$

wherein $\hat{\phi}_{im}$ is the phase error estimate for stream i during symbol m, $s_n$ is an estimate of noise power, $I_{Nss}$ is an $N_{ss} \times N_{ss}$ identity matrix where $N_{ss}$ is a total number of spatial streams, H is a mathematical value that represents a signal channel, $H_m$ is a modified channel matrix that contains k times more rows than the channel $H_k$ per subcarrier and $r_{mk}$ is a received pilot vector for pilot k at symbol m.

31. A computer-program product for wireless communication, comprising:
a non-transitory machine-readable medium encoded with instructions executable to:
receive a plurality of spatial streams, wherein each of the spatial streams comprises a symbol having at least one phase shifted pilot signal;
compute Minimum Mean Square Error (MMSE) estimates of the phase shifted pilot signals;
estimate phase errors for the symbols using the MMSE estimates
compute channel state information, wherein the MMSE estimates are computed using the channel state information and the channel state information is computed on a per symbol basis,
store a copy of the pilot signals, wherein the phase errors are estimated from the computed MMSE estimates and the copy of the pilot signals, and
phase rotate the copy of the pilot signals and the channel state information for one of the spatial streams when estimating the phase error to compensate for a cyclic delay in said one of the spatial streams.

32. An access point, comprising:
a wireless network adapter configured to support a backhaul connection for a peer node to a network; and a processing system configured to:
- receive a plurality of spatial streams wherein each of the spatial streams comprises a symbol having at least one phase shifted pilot signal;
- compute minimum mean square error (MMSE) estimates of the phase shifted pilot signals;
- estimate phase errors for the symbols using the MMSE estimates
- compute channel state information, wherein the MMSE estimates are computed using the channel state information and the channel state information is computed on a per symbol basis,
- store a copy of the pilot signals, wherein the phase errors are estimated from the computed MMSE estimates and the copy of the pilot signals, and
- phase rotate the copy of the pilot signals and the channel state information for one of the spatial streams when estimating the phase error to compensate for a cyclic delay in said one of the spatial streams.

* * * * *